US012489952B1

(12) United States Patent
Bhasker et al.

(10) Patent No.: US 12,489,952 B1
(45) Date of Patent: Dec. 2, 2025

(54) ENHANCED MULTIMODAL CREATION AND DISPLAY OF OBJECT JUMPLINKS IN VIDEOS

(71) Applicant: Amazon Technologies, Inc., Seattle, WA (US)

(72) Inventors: Bhavana Bhasker, Seattle, WA (US); Kimberly Chan Bo Yin Canlas, New York, NY (US); Abhimanyu Sahai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 11 days.

(21) Appl. No.: 18/676,408

(22) Filed: May 28, 2024

(51) Int. Cl.
| | |
|---|---|
| *H04N 21/47* | (2011.01) |
| *G06F 3/04842* | (2022.01) |
| *G06V 10/74* | (2022.01) |
| *G10L 15/26* | (2006.01) |
| *H04N 21/472* | (2011.01) |

(52) U.S. Cl.
CPC ... *H04N 21/47217* (2013.01); *G06F 3/04842* (2013.01); *G06V 10/761* (2022.01); *G10L 15/26* (2013.01)

(58) Field of Classification Search
USPC ....................................................... 386/241
See application file for complete search history.

(56) References Cited

U.S. PATENT DOCUMENTS

| | | | |
|---|---|---|---|
| 8,682,739 B1 | 3/2014 | Feinstein | |
| 9,973,819 B1 | 5/2018 | Taylor et al. | |
| 10,055,783 B1 | 8/2018 | Feinstein | |
| 10,440,435 B1 | 10/2019 | Erdmann et al. | |
| 10,440,436 B1 | 10/2019 | Taylor et al. | |
| 2011/0069230 A1* | 3/2011 | Polumbus | H04N 21/4884 707/711 |
| 2011/0267419 A1* | 11/2011 | Quinn | G06F 3/04842 348/E7.083 |
| 2014/0207449 A1* | 7/2014 | Johnson | G10L 15/26 704/235 |

* cited by examiner

*Primary Examiner* — Nigar Chowdhury
(74) *Attorney, Agent, or Firm* — Eversheds Sutherland (US) LLP

(57) ABSTRACT

Devices, systems, and methods for generating and presenting jumplinks for objects in video may include generating, by a language machine learning model, textual summaries of audio present in video frames, the textual summaries indicative of objects represented in the video frames; identifying unique identifiers of the objects indicated in the textual summaries; determining, by the language machine learning model, textual similarity scores between the information and the textual summaries; selecting, based on textual similarity scores, an object corresponding to a unique identifier and likely to be represented in one or more of the video frames; generating a jumplink for the video, the jumplink corresponding to a video frame in the video where the object is represented; and presenting the video and an indication that the jumplink corresponds to the video frame.

20 Claims, 15 Drawing Sheets

ENHANCED MULTIMODAL CREATION AND DISPLAY OF OBJECT JUMPLINKS IN VIDEOS

BACKGROUND

Videos may display and discuss objects of interest in certain portions, but not necessarily all portions. For example, a one-hour video may show an object for a few minutes. A viewer may be interested in some objects in the longer video, but may not want to have to watch or skip through the entire video to identify the smaller portion of the video with an object of interest.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
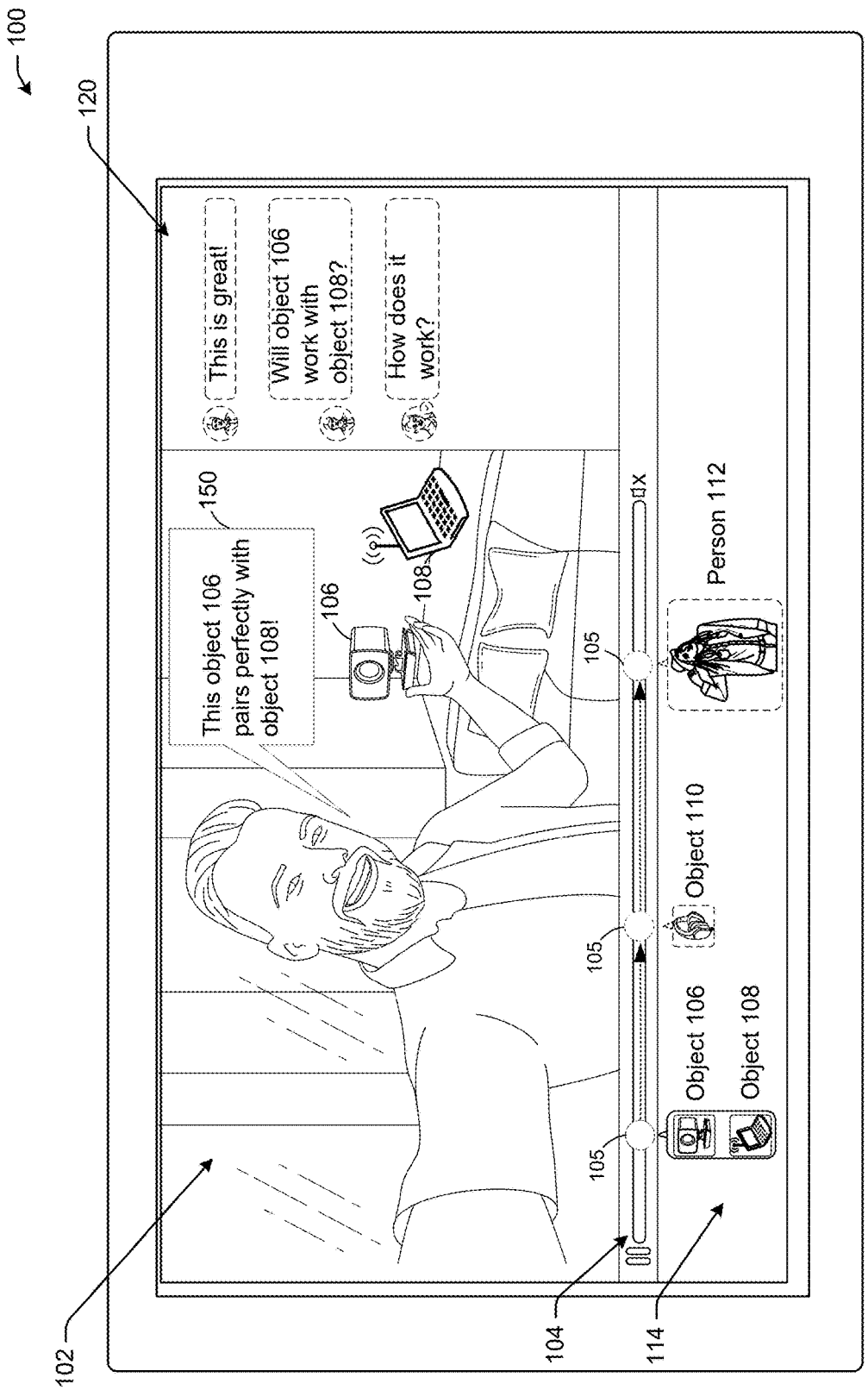
FIG. 1 illustrates an example video presentation with object-based jumplinks, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for creation and display of jumplinks in video.

Video frames may present objects (e.g., a physical entity, whether living or non-living, animate or inanimate, including, but not limited to items, products, people, animals, organisms, structures, devices, substances, or any combination thereof, and that may possess tangible or intangible properties and may exist in various forms, states, or configurations). A person may desire to view portions of video showing and/or discussing certain objects without having to view the entire video or search through the entire video, or video portions, for objects of interest.

Jumplinks are links that direct a user to a specific portion (e.g., video frame) of a video. For example, a video may have a location (e.g., a uniform resource locator-URL) corresponding to an address from where the video can be retrieved. A jumplink may link to a specific time/location (e.g., video frame) of a video, and multiple different jumplinks may link to multiple different times/locations in the same video. By selecting a jumplink corresponding to where an object is presented in a video (e.g., the jumplink represented by an image or other indication of the object), a user may be directed to the specific video frame to where the select object jumplink corresponds.

To create selectable jumplinks for users viewing video to skip to a relevant portion of video in which an object of interest is shown or discussed, a video creator may manually select tags of objects during or after recording the video. However, this manual process may result in a lack of precision in that the person tagging objects, as people may fail to tag the object at the time when they are actually presented in the video frames. Sometimes a person may simply forget to tag an object. In addition, the video creator may have to manually provide input topics for video segments. Object tagging is often at a segment level, with a chapter corresponding to a segment of frames that cannot overlap with another chapter, and therefore chapter jumplinks do not allow for overlapping topics.

Automating the detection of objects of interest for the creation of jumplinks can be enhanced by multimodal machine learning techniques. Whereas image-based object detection may identify objects of interest in video frames, the detection accuracy can be undermined by occlusion, camera views, whether an object is the foreground or background, and other reasons. The enhanced multimodal approaches herein allow for machine learning analysis of text in addition to image data to improve the detection accuracy. Some existing techniques for discerning objects in video may identify text displayed in the video or convert video speech to text in order to identify an object's category, but they lack the ability of more sophisticated machine learning analysis to identify similarities in textual characteristics between video transcripts and information that identifies the specific object in the video.

Some techniques may analyze video frames for objects that are similar to those shown in the video frames, but such techniques do not necessarily identify the same object. For example, a bright sweater may be shown in a video frame, but a person interested in a particular sweater may want to see that sweater in the video rather than be directed to a similar sweater.

A video playback scrubber may allow a user to navigate to video frames corresponding to different times in a video. Existing scrubber displays with jumplinks may show different segments corresponding to a category, but lack the ability to seamlessly embed actual objects within the scrubber to allow a user to jump to a video frame with the exact object for which they are looking.

In one or more embodiments, the enhanced object identifier techniques herein may include a data ingestion, a multimodal object identifier, and in some situations, an object validator. The multimodal object identifier may analyze video frames for image feature similarities, and may compare transcripts of the speech in the video frames to text for an object (e.g., a product page where an object is sold, a page with information about a person, etc.) to identify the closest matching objects presented in video frames as the likely objects actually shown in the video frames. For example, when a particular curling iron is shown in the video frames, that specific curling iron may be identified using the machine learning techniques herein rather than simply recognizing that the object in the video frames is a curling iron, and rather than generating a link to a similar object (e.g., a link to a product page for a similar curling iron), a jumplink may be created to the video frame(s) where the exact curling iron is shown. The machine learning used in the image and textual analyses improves object detection accuracy and video frame precision with respect to non-machine learning techniques, as explained further herein.

In one or more embodiments, in a validation mode in which a carousel of images or other indicators presents selectable images or other indicators of objects for a video creator to tag as present in a given video frame, the object validator may validate, using the text data comparison, whether the object identified in a video frame is being discussed in that video frame, and is therefore likely to be presented in that video frame. In a predictive mode in which the carousel is not present and the video creator does not select the objects in given video frames, the validation step is unnecessary because there is no user selection of objects to verify in the video frames. The object identifier techniques herein may apply to real-time livestream videos (e.g., creation of the jumplinks during a livestream), pre-recorded livestream videos, and other types of videos (e.g., video titles, advertisements, and the like) and/or other media (e.g., audio such as podcasts describing objects, etc.).

In one or more embodiments, to identify objects in the video frames, the multimodal object identifier may leverage unique identifiers of objects for prediction. For the textual analysis, a multi-modal machine learning model may compare textual similarity between object highlights (e.g., for a page or description corresponding to a unique identifier of an object) and a transcript at corresponding timestamps of the video. When an object with a unique identifier is not identified (e.g., selected) by a user as being presented in a video frame, the model may dynamically determine the unique identifiers at a given timestamp by comparing the unique identifier to a list of unique identifiers corresponding to objects identified in the video. An objective function for the unique identifier process is defined by:

$$\theta = \max\left(\left(\frac{1}{N}\sum_{1}^{N} TextualSimilarity(T_{summary}, A_{featured})\right) + MultimodalSimilarity(A_{predicted}, A_{selected})\right), \quad (1)$$

where N is the total number of featured timestamps in the video, $T_{summary}$ is a transcript summary at a timestamp, $A_{featured}$ is a unique identifier of an object in the video, $A_{predicted}$ is a predicted unique identifier (e.g., its corresponding object) and its details for a given timestamp, $A_{selected}$ is a list of selected unique identifiers for the video, TextualSimilarity computes the textual similarity between two parameters, MultimodalSimilarity computes the multimodal similarity between two parameters, and $\theta$ is the unique identifier prediction when deviation from the expected timestamp is minimal.

In one or more embodiments, the object validator may assess textual congruence between the extracted textual summary at a specified timestamp of the video and corresponding metadata for the unique identifier corresponding to the object identified in the video frame at the timestamp. When the cosine similarity exceeds a predefined threshold, the confidence score may be sufficient to generate a jumplink presenting the object at the highlighted time (e.g., via the video player scrubber). Visual cues may play a peripheral role in the validation process given that object images may be identified in the video, and objects may already be available on the carousel. As a result, the validation focuses on the textual cues to ascertain whether the object is being discussed in the video.

In one or more embodiments, a selection of object images in the video frames may serve as a basis for candidate images in the machine learning similarity comparison. The multimodal object identifier may extract candidate object/images that exhibit high relevance to specific frames. To facilitate the comparison process, the video may be segmented into multiple frames (e.g., segments of N frames). The segmentation may represent a preprocessing step to isolate frames intended for input to a similarity model for analysis. Test results have shown that a larger N value for the segments improves the precision of identifying the frames where the object is presented.

In one or more embodiments, after frame extraction and unique identifier image collection, a pretrained model (e.g., a contrastive language-image pretraining model) may be used to assess similarity between extracted frames and images with the objects. The resulting list of images and their respective confidence scores from the model may be provided to a consensus algorithm. However, because video transcripts may not be readily available for semantic similarity matching, an important preprocessing step may include extracting the transcript from the video (e.g., using a speech-to-text framework). The extracted transcripts may be passed to a language model (e.g., a large language model) to generate summaries of the transcripts. A prompt provided to the language model may be engineered to extract object information within the summary, assigning significance to identified object types. Then, the summary may be compared with object name descriptions to extract matching unique identifiers. To facilitate this comparison, text data may be converted to a low-dimensional representation using a pretrained model (e.g., a bidirectional encoder representations and transformers model-BERT). When textual similarity has been computed between unique identifier object names and transcripts, the results may be forwarded to the consensus algorithm, which may integrate unique identifiers from both image similarity and textual similarity. By considering objects where both the image similarity and textual similarity have confidence scores exceeding respective confidence thresholds, the consensus algorithm may select the corresponding unique identifiers for a given timestamp.

In one or more embodiments, the consensus algorithm may be represented by:

$$T = (0.3 \cdot T) + 0.3, \text{Confidence} = \frac{I+T}{2}, \quad (2)$$

where I represents the image similarity score, and T represents the updated text similarity cosine similarity score. The confidence score may be computed by averaging the image similarity score and the text similarity score, and the text similarity score may be assigned a higher weight based on text results that show that the text cosine similarity score is enhanced significantly. When the same unique identifier is predicted by both the image analysis and the textual analysis, the unique identifier with the highest confidence score may be selected as the predicted unique identifier for the video frame.

In one or more embodiments, the user interface presenting the video and the video timeline may use trick play preview jumplinks for the items in the video. Trick play uses visual cues as a person moves the play head of the timeline (e.g., scrubber) forward and backward to show a subset of the video frames. The subset may include the video frames showing the object identified in the frames so that as a user drags the play head along the timeline looking for objects of interest, the identified objects in the video may be shown in trick play frames to notify the user where to place the play head to see the corresponding frames.

In one or more embodiments, the video playback timeline may be divided into segments with a start and end indication. The segments may correspond to the objects identified as presented in the video frames of the corresponding segments. For example, a segment of the timeline may be presented with a corresponding image of the objects presented in the segment so that a user may identify which objects are present in a corresponding segment. The segments may use a heat map style in which the segments are shown in different colors, shades, patterns, etc. to distinguish between them based on which objects are shown in the segments, and/or to indicate user engagement types or levels for the objects (e.g., most frequently viewed objects, trending objects, etc.). In some embodiments, as a user slides the play head along the timeline, haptics or other signaling (e.g., audio, visual, text, etc.) may be used to signal to the user when the play head is at a time when an identified object of interest is present in the video. In some embodiments, a hover option for the timeline may allow a user to hover (e.g., with a mouse, touch pad, etc.) over a portion of the timeline, which may cause that portion of the timeline to be enlarged in presentation so that the user may see the segments and their start and end times more easily.

In one or more embodiments, which objects are shown via images corresponding to jumplinks in the timeline as objects of interest may be customized. For example, a subset of the objects in video may be selected for the jumplinks and timeline based on overall popularity (e.g., most frequently viewed/selected/searched objects, objects with the most likes or positive reviews/reactions, etc.) and/or based on a user's interest (e.g., based on items in a user's virtual shopping cart at the time, search queries from the user, purchase/viewing histories, or the like). The image selected for an object may be selected, from among multiple images of the object on an information page of the object, based on user preferences, user interactions with the images, image resolution, similarity to the way the object appears in the video frames, or the like.

In one or more embodiments, links to pages for items objects corresponding to jumplinks in the video may be embedded into the video, such as within the objects in the video (e.g., using bounding boxes for the identified objects in video frames) or within advertisements. In this manner, deep links may be used to link to pages with more information to the identified objects in the video, and to pages from where the items may be purchased.

In one or more embodiments, to identify the objects in video for the creation of jumplinks, an application programming interface (API) may be called. For example, the API call may request a link to cloud object storage, and may return a response with a JavaScript Object Notation (JSON) list of identified unique identifiers corresponding to the objects in a given video. The API response may return the unique identifiers, their start and end times, and their confidence scores from the model used to identify them.

In one or more embodiments, machine learning prompts (e.g., for the language model) may include extracted text from video for the model to analyze, and/or may request the model to identify and provide object attributes based on text associated with the object (e.g., title, description, summaries, reviews, frequently asked questions, object properties, etc.).

In one or more embodiments, when a user selects an object image for an object with a corresponding video jumplink, instead of the user being redirected to a page with more information about the object, an overlay interface may be presented with the additional information. The overlay interface may be presented so that the user does not need to leave the video interface, and can continue viewing the video without having to switch between multiple pages.

In one or more embodiments, when a user first views a video with jumplinks, the video may be presented with instructions teaching the user how to engage with the timeline and use the jumplinks. For example, the play head may be highlighted or otherwise indicated to show that the user may drag the play head and see jumplinks for objects at corresponding video frames that present the objects. Alternative or additional instructions may include on-screen text and/or video to explain to the user how to use the jumplinks.

When an object is a person, identifying the object in video is performed with user consent and in accordance with relevant laws.

In one or more embodiments, the jumplinks may be implemented using a combination of HyperText Markup Language (HTML), JavaScript, and the media player's application programming interface (API). In an example, within a video player's HTML markup, anchors or buttons may be created with links pointing to the video's uniform resource location (URL), along with parameters indicating the corresponding timestamp (e.g., <a href="http://example.com/video.mp4 #t=30">Jump to 30 seconds</a>). In one embodiment, JavaScript may be used to handle a click event (or other interaction) with a jumplink. JavaScript may extract the timestamp parameter from the URL and use the media player's API to seek the corresponding time in the video or other media. In some embodiments, the media player used may be configured to support seeking to specific timestamps within the media (e.g., API built-in functionality to enable the behavior).

Benefits of the enhanced techniques herein include improved user engagement with video or other media, improved content accessibility, improved content navigation efficiency (e.g., allowing users to avoid presentation of undesired content), reduced network latency (e.g., resources used to present content), improved accuracy in identification of objects identified in media, improved accuracy in time/location at which objects are presented in media, and other benefits as described herein.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example video presentation 100 with object-based jumplinks, in accordance with one or more embodiments of the present disclosure.

Referring to FIG. 1, a video with multiple video frames may be presented along with a scrubber 104 timeline with a play head 105. As shown in FIG. 1, video frame 102 of multiple video frames of the video may show multiple objects and/or people (e.g., object 106 and object 108) corresponding to unique identifiers (e.g., a unique identifier for the object 106 and a unique identifier for the object 108), allowing them to be identified for the creation of jumplinks for controlling the scrubber 104. For example, the object 106 and the object 108 may be present (e.g., shown and/or discussed) in the video frame 102. A different object 110 (e.g., also having a unique identifier) may be present in a different video frame of the video. A person 112 (e.g., an object also having a unique identifier) may be present in a different video frame of the video. The object 106, the object 108, the object 110, and the person 112 may be identified (e.g., with proper permission/authorization and compliance) using the enhanced multimodal machine learning techniques herein, along with which video frames in which they are present. When the objects and people are identified, along with their corresponding video frames, jumplink images 114 may be created for the scrubber 104, and the jumplink images 114 may include embedded jumplinks (e.g., URLs) corresponding to specific video frames in the video. As shown, the object 106 and the object 108 may be presented in-line with the location of their video frame (e.g., the video frame 102) relative to all of the video frames in a timeline represented by the scrubber 104. The object 110 may appear in-line with the frame(s) where it appears. The person 112 may appear in-line with the frame(s) where they appear. In this manner, a viewer of the video may see when a particular object is present in the video, and by selecting the object in-line with the scrubber 104 (e.g., jumplinks for the respective objects/people), the scrubber 104 may jump playback to the corresponding frame. Alternatively or in addition, the play head 105 may be moved to corresponding video frames where the objects/people in the jumplinks are indicated. When the play head 105 is being moved along the timeline, the jumplink images 114 may be presented as trick play images, for example, representing subset of the video frames shown over a particular portion of time in the video.

Still referring to FIG. 1, when the video frame 102 is part of a livestream video, for example, the video frame 102 may be presented with an optional chat feature that may allow users viewing the livestream video to enter comments, questions, and the like. The livestream video may be presented with the jumplink images 114 in real-time (e.g., the jumplinks for the jumplink images 114 may be generated in real-time during presentation of the livestream). Alternatively, the livestream may have concluded, and presentation of the video frame 102 may represent a pre-recorded version of the livestream with the jumplink images 114 created. Alternatively, the video frame 102 may be part of a video title, such as a movie, television show, documentary, or the like, which may be presented with the jumplink images 114 to shown when objects or people of interest in the video title may be present, and to allow a viewer to jump to the relevant frames where objects or people of interest are present (e.g., by selecting a corresponding object presented in the jumplink images 114).

In one or more embodiments, the detection (and optional validation) of objects/people in the video frames may include both image-based object detection and textual analysis. For example, a text caption 150 is shown in the video frame 102 to represent spoken dialogue in the video frame 102 (e.g., not an actual speech bubble shown in the video frame). The dialogue or other audio in the video may be transcribed (e.g., using speech-to-text techniques) to generate a text transcript. The features of the text may be used, in addition to the image analysis, to identify the object 106, the object 108, the object 110, and the person 112 as present in the video, as explained further herein.

Figure 2:
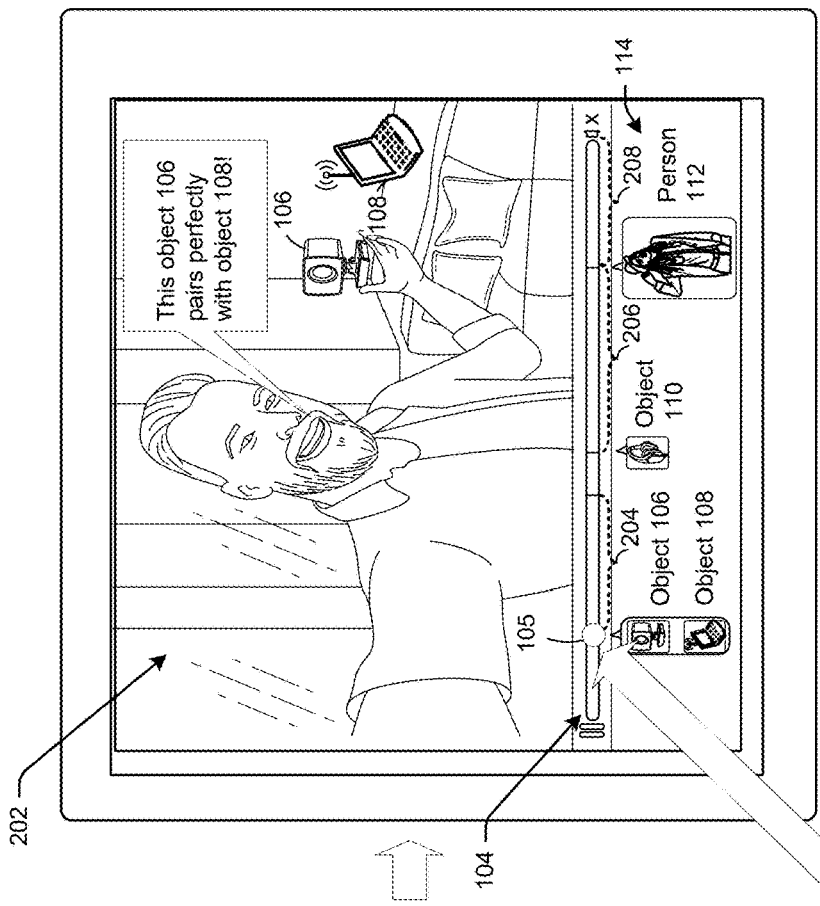
FIG. 2 illustrates example selection of a jumplink, in accordance with one or more embodiments of the present disclosure.
Figure 2:
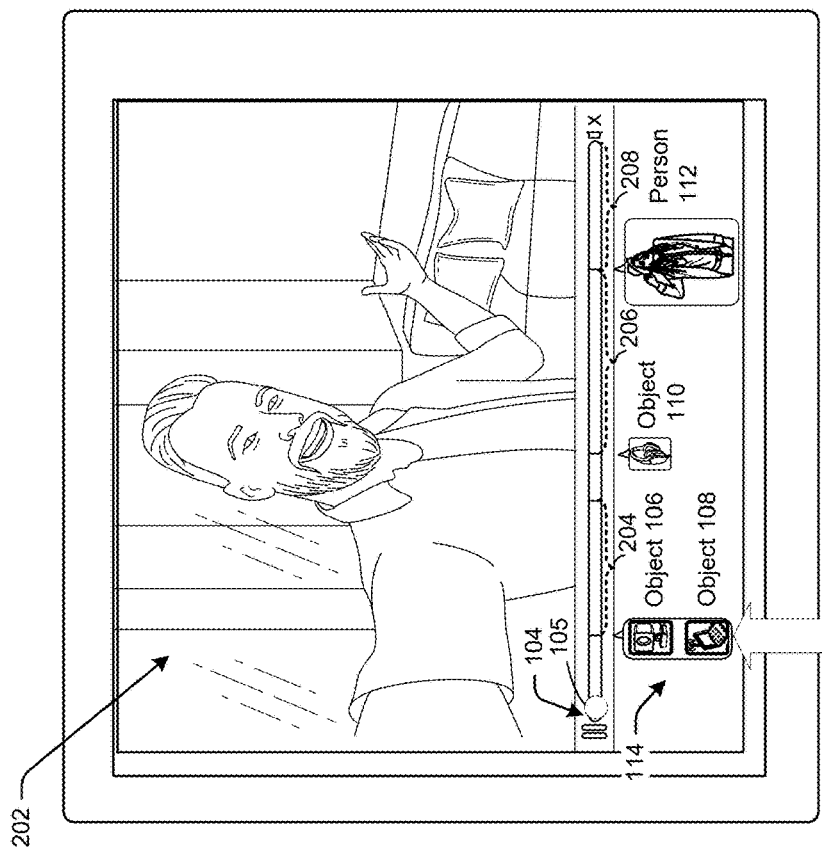

FIG. 2 illustrates example selection of a jumplink, in accordance with one or more embodiments of the present disclosure.

Referring to FIG. 2, a video frame 202 may be presented (e.g., an initial video frame or other video frame without an object corresponding to a unique identifier). Because the object 106, the object 108, the object 110, and the person 112 may be identified in subsequent frames, selection of a jumplink image 114 (e.g., for the object 106 or the object 108) may cause playback via the scrubber 104 to skip from the video frame 202 to the video frame 102 (e.g., skipping referring to not having to play the video frames in between the video frame 202 and the video frame 102). In this manner, a user may jump to video frames presenting objects and/or people of interest without having to watch an entire video and without having to manually search for where the objects or people are present by moving the scrubber 104 until the user sees them.

Still referring to FIG. 2, the video may be divided into segments indicated by the scrubber 104. For example, segment 204 may present the object 106 and the object 108. Segment 206 may present the object 110. Segment 208 may present the person 112. In this manner, a user may see where an object is presented, and may move the play head 105 to a corresponding segment.

Alternatively or in addition to selecting a jumplink image, a user may manually move the play head 105 to a jumplink location in the video, or the objects/people in the jumplinks may be presented when the play head 105 is moved to a corresponding segment where an object is presented.

In one or more embodiments, the video segments may be identified in the video based on detected scene changes (e.g., when two subsequent video frames differ significantly from one another, indicating a scene change from one of the video frames to the next). A segment may represent a start of a scene to an end of the scene (e.g., after which the video frames change significantly to another scene). Using scene changes to identify the segments may improve the accuracy of the segments with respect to which video frames correspond to a segment in which an object of interest is presented.

Figure 3:
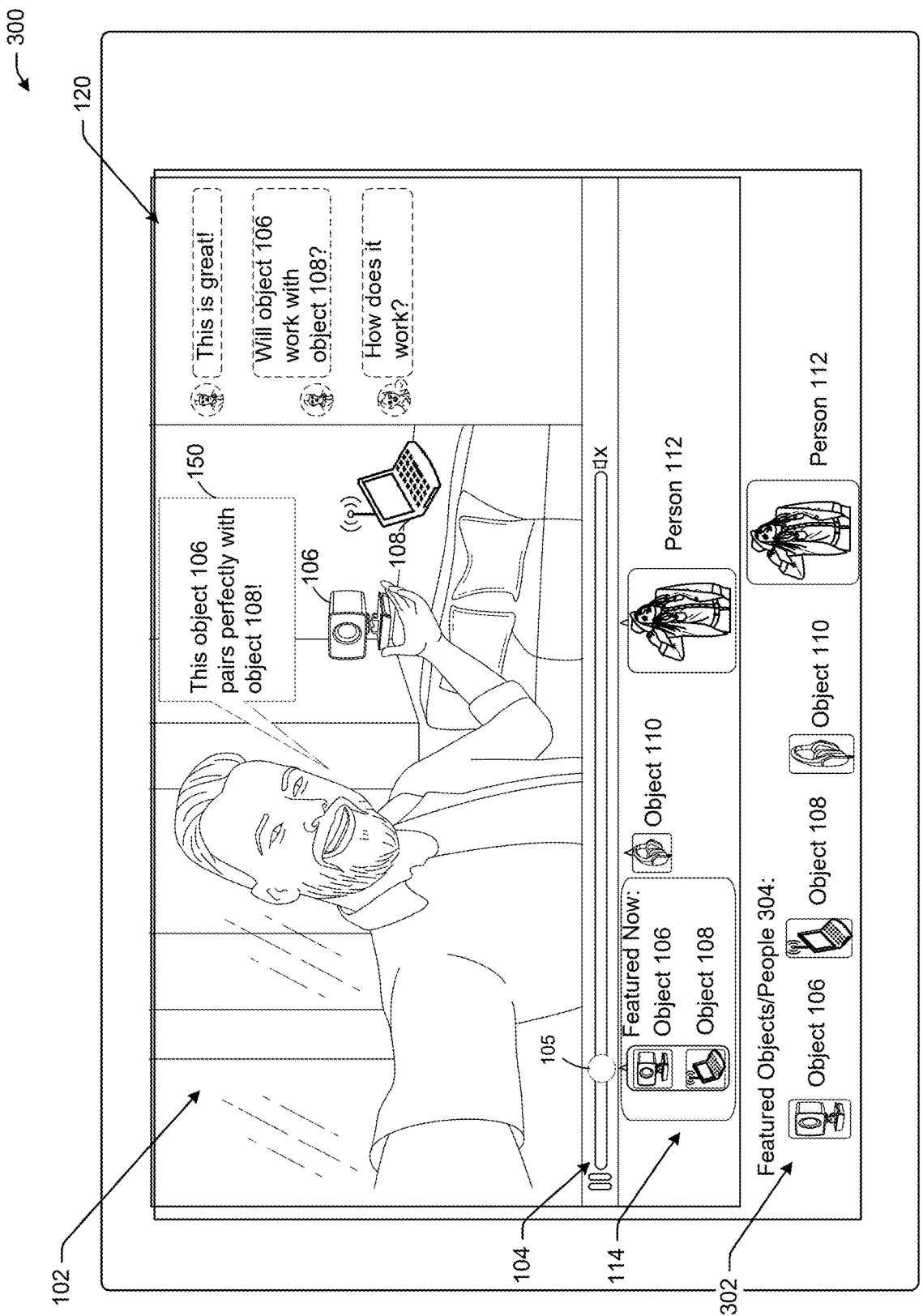
FIG. 3 illustrates an example video presentation with object-based jumplinks and an image carousel, in accordance with one or more embodiments of the present disclosure.

FIG. 3 illustrates an example video presentation 300 with object-based jumplinks and an image carousel 302, in accordance with one or more embodiments of the present disclosure.

Referring to FIG. 3, a video creator (e.g., of the video frames with the video frame 102) may identify the objects and/or people featured in the video by selecting or otherwise providing an indication of the people and/or objects with unique identifiers. The objects and/or people that are identified by the video creator may be presented in the image carousel 302 (e.g., featured objects/people 304 in this video, etc.).

In one or more embodiments, because the objects/people may be identified by the creator, and their images shown in the image carousel 302, the visual cues from the video may be peripheral to the object detection. When the image carousel 302 is present with presentation of the video, the validation process relying on text (e.g., a transcript including "This object 106 pairs perfectly with object 108") may be used to validate that the object identified by the creator for the image carousel 302 is actually presented in the video, and presented via the video frame 102. For example, there may be a time delay between when an object is present in the video and when the video creator identifies the object as present (e.g., the object 106 and/or the object 108 may be present before the video frame 102, but may not be identified by the creator until the video frame 102). The validation process may use textual data, as explained further herein, to generate the jumplinks for the jumplink images 114 in an accurate manner in which a jumplink for a respective object corresponds to the frame when the object is actually introduced or present in the video.

Figure 4:
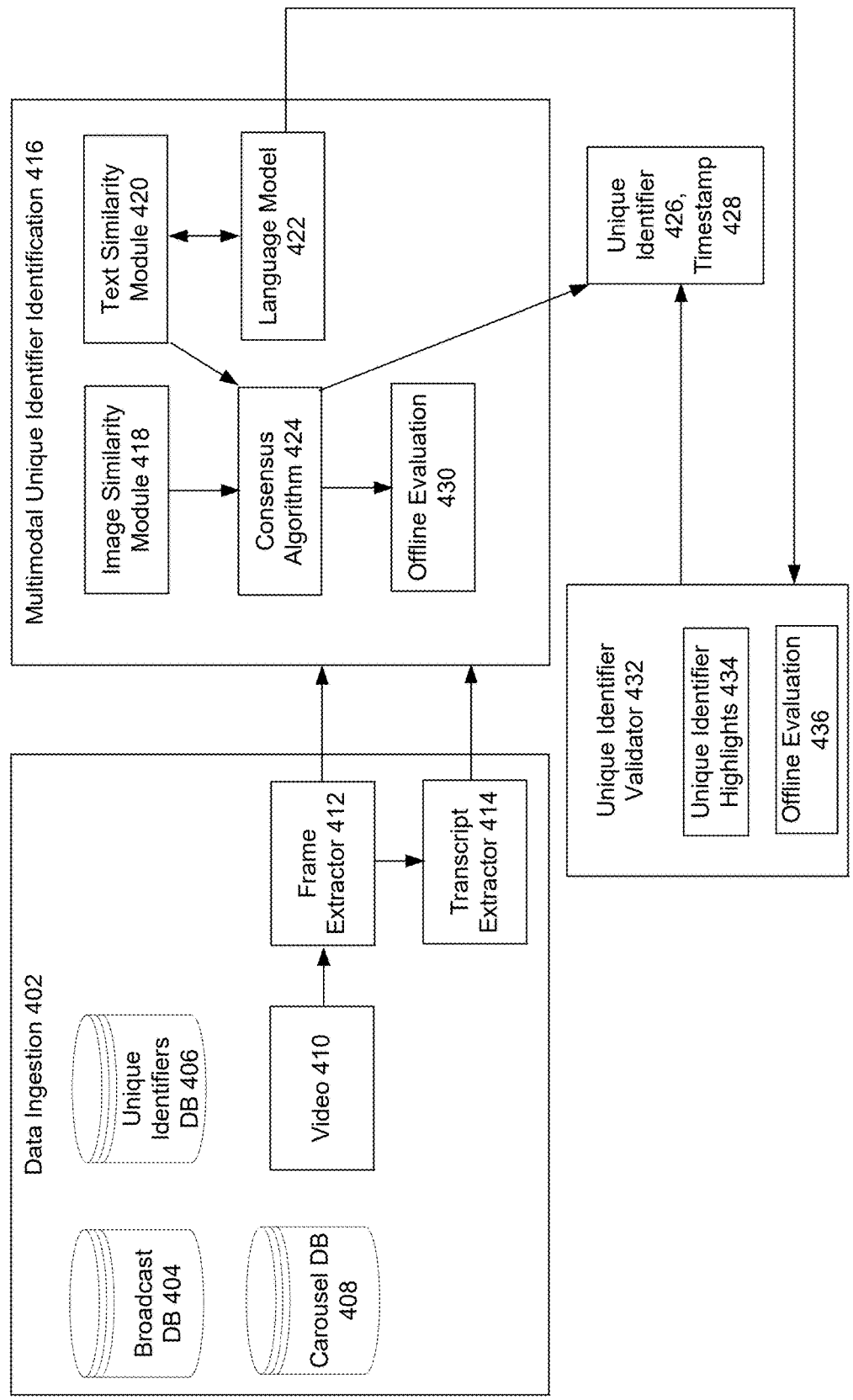
FIG. 4 illustrates an example architecture for video presentation with object-based jumplinks, in accordance with one or more embodiments of the present disclosure.

FIG. 4 illustrates an example architecture 400 for video presentation with object-based jumplinks, in accordance with one or more embodiments of the present disclosure.

Referring to FIG. 4, the architecture 400 may include a data ingestion 402 with a broadcast database (DB) 404 (e.g., storing videos), a unique identifiers DB 406 (e.g., storing unique identifiers corresponding to objects and/or people), and a carousel DB 408 (e.g., storing images of the objects or people corresponding to the unique identifiers, and storing user interface data including the images for presentation during playback of a video). Video 410 (e.g., video frames from the broadcast DB 404 or elsewhere) may be input to a frame extractor 412, which may extract frames from the video 410 in a preprocessing step in which the video 410 is divided into segments of frames. A transcript extractor 414 may use speech-to-text techniques to convert speech from the video frames to text in the form of a transcript. The transcript and the extracted video frames may be provided to a multimodal unique identifier identification 416.

Still referring to FIG. 4, the multimodal unique identifier identification 416 may include an image similarity model for assessing similarity between extracted frames and images of the objects or people corresponding to the unique identifiers (e.g., images in the carousel DB 408). A list of images showing the objects/people with unique identifiers that may be present in the video frames may be produced by the image similarity module 418 as explained further herein. For multimodal analysis, a text similarity module 420 may use a language model 422 (e.g., a LLM) to generate summaries of the transcript generated by the transcript extractor 414. A prompt provided to the language model 422 may request object type information within the summary to be generated by the language model 422, assigning a significance to identified object type. The summary generated by the language model 422 may be compared with unique identifier object name descriptions to extract matching unique identifiers that correspond to the matching objects/people, as explained further herein. Once textual similarity between unique identifier names and transcripts has been determined, the results may be forwarded to a consensus algorithm 424, which may use Equation (2) above for assessing both image and textual similarities. The consensus algorithm 424 may select unique identifiers (e.g., corresponding to objects/people) for a given timestamp of the video 410, based on a confidence score indicating the likelihood that a unique identifier 426 is present in the video 410 at a corresponding timestamp 428. The unique identifier 426 with the highest confidence score for a given object in a frame may be selected as the predicted object for which to generate a jumplink image with a corresponding jumplink to the video frame corresponding to the timestamp 428. An offline evaluation 430 may be performed to assess the performance of the consensus algorithm 424, and may result in updating the unique identifier 426 and/or the timestamp 428.

Still referring to FIG. 1, when an image carousel is present (e.g., as in FIG. 3) based on objects/people selected by a video creator, the image data may become peripheral to the analysis. A feature unique identifier validator 432 may validate, based on the textual analysis performed by the language model 422, that the text from the video transcript corresponds to the unique identifier 426 at the timestamp 428. The unique identifier validator 432 may include an evaluation of unique identifier highlights 434 in which the unique identifier validator 432 may assess textual congruence between the extracted transcript summary at the specified timestamp 428 and the corresponding metadata information for the unique identifier 426 (e.g., data from a product or other page, a description of the object, a name/title of the object, or the like). The cosine similarity technique described above may be used by the unique identifier validator 432. An offline evaluation 436 may be performed to evaluate performance of the unique identifier validator 432, and may result in updating of the unique identifier 426 and/or the timestamp 428. The unique identifier validator 432 may validate or update the unique identifier 426 and/or the timestamp 428.

Figure 6A:
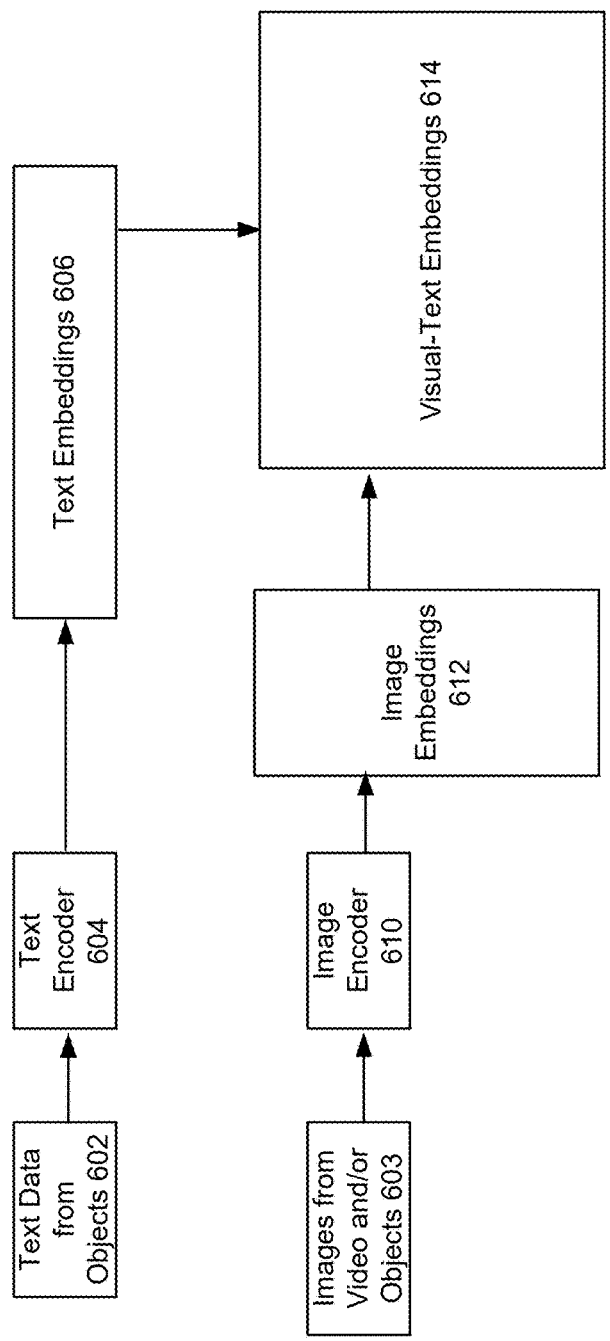
FIG. 6A illustrates an example pre-training for the image similarity module of FIG. 4, in accordance with one or more embodiments of the present disclosure.
Figure 6B:
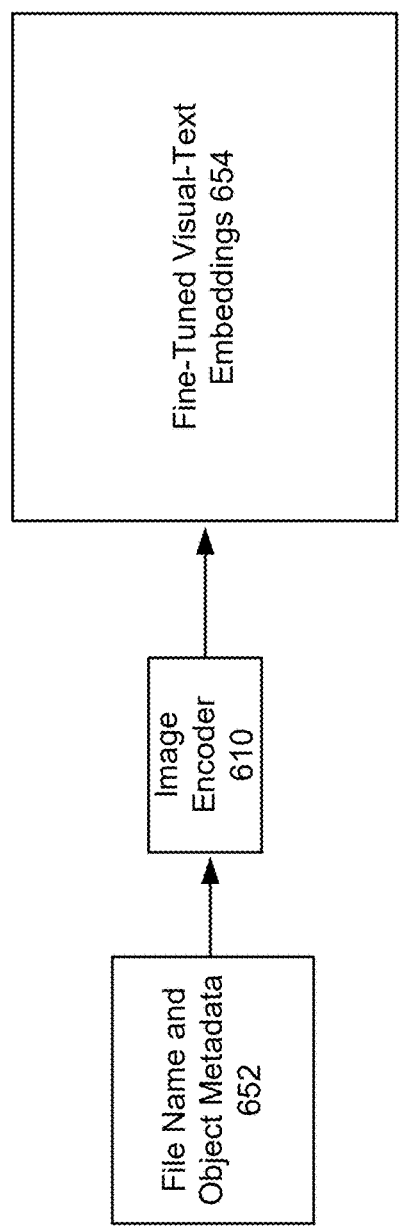
FIG. 6B illustrates an example zero-shot image prediction for the image similarity module of FIG. 4, in accordance with one or more embodiments of the present disclosure.

In one or more embodiments, the text data from the video 410 may be converted by the transcript extractor 414 into a low-dimensional representation using a pre trained BERT model, for example. The image similarity module 418 may use a pre-trained contrastive language-image pre-training model, for example, to assess the similarity between the extracted frames and the unique identifier images (e.g., as shown in FIGS. 6A and 6B).

In one or more embodiments, the jumplinks for the jumplink images 114 of FIG. 1 may be created using the unique identifier 426 and the timestamp 428. As shown in FIG. 1, when an object is present at the video frame 102, a jumplink image 114 may include an image of the identified object in the video frame 102, and the jumplink image 114 may include an embedded jumplink to the video frame 102 corresponding to the timestamp 428 so that, when the jumplink image 114 is selected for the object, the scrubber 104 jumps the timeline to the timestamp 428 (e.g., to the video frame 102).

Figure 5:
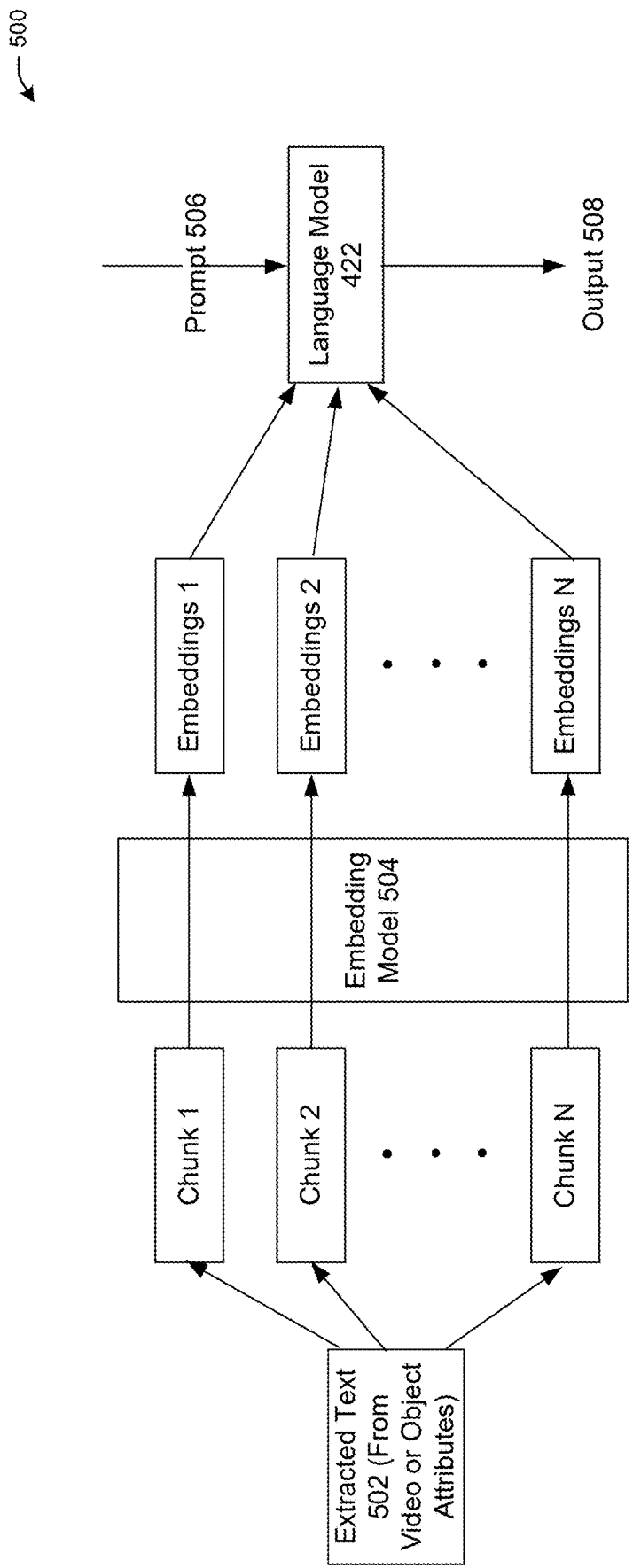
FIG. 5 illustrates an example machine learning architecture using the language model of FIG. 1, in accordance with one or more embodiments of the present disclosure.

FIG. 5 illustrates an example machine learning architecture 500 using the language model 422 of FIG. 1, in accordance with one or more embodiments of the present disclosure.

Referring to FIG. 5, extracted text 502 (e.g., extracted from the video 410 of FIG. 4 using the transcript extractor 414 and/or from object attributes such as name, description, reviews, etc.) may be divided into chunks 1-N (e.g., chunks of a number of characters). The chunks may be embedded into vector embeddings using an embedding model 504 (e.g., embeddings 1-N). The embeddings may be vectors whose respective values correspond to a quantitative value for a respective textual feature. The embeddings may be input to the language model 422, along with a prompt 506 requesting the language model 422 to extract object type information from the extracted text 502, to generate summaries of the extracted text 502 that include the object type information, and to assign a significance to the identified objects/people in the text (e.g., indicative of how significant the object is to the text). The prompt 506 may include the extracted text 502 or may request object attributes from the language model 422. The language model 422 output 508 may include the summaries and the significance of the identified object types/people to the text. The summary in the output 508 may be provided to the text similarity module 420 of FIG. 4 for comparison to low-dimensional embedding vectors of object names and descriptions to determine the textual similarity that may be provided to the consensus algorithm 424 of FIG. 4.

In one or more embodiments, the prompt 506 may provide text with an object title and description, and may provide questions such as, "What is the object? What is the purpose of the object? What is the color of the object? What is the size of the object? What category is the object? What object features are described" and the like, with a defined format for the output (e.g., XML, etc.). The answers to the questions may be identified from the text depending on whether the text includes corresponding descriptions.

FIG. 6A illustrates an example pre-training 600 for the image similarity module 418 of FIG. 4, in accordance with one or more embodiments of the present disclosure.

Referring to FIG. 6A, the pre-training 600 may include text data from objects 602 may be input to a text encoder 604, which may generate text embeddings 606 (e.g., $T_1, T_2, \ldots, T_N$) representing textual features of the text data from objects 602. Images from the video and/or objects 603 may be input to an image encoder 610, which may generate image embeddings 612 (e.g., $I_1, I_2, \ldots, I_N$) representing image features of the images 603. The text embeddings 606 and the image embeddings 612 may form a visual-text embeddings 614 (e.g., pairwise information—$I_1T_1, I_1T_2, \ldots, I_NT_N$) for the text data from objects 602 and the images 603.

Given an image, the image similarity module 418 may predict text paired with the image by learning which visual features of images associate with which textual features.

FIG. 6B illustrates an example zero-shot image prediction 650 for the image similarity module 418 of FIG. 4, in accordance with one or more embodiments of the present disclosure.

Once the image similarity module 418 has been pre-trained as in FIG. 6A, a file name of objects and object metadata 652 may be input to the image encoder 610, which may generate fine-tuned visual text embeddings 654 that are fine-tuned based on the labels of the file name of objects and object metadata 652. The fine-tuning may allow the image similarity module 418 to predict an image caption corresponding to an image. Use of the file name of objects and object metadata 652 may provide an enhancement over using only the object filename, specifically improving the accuracy of the output.

Figure 7:
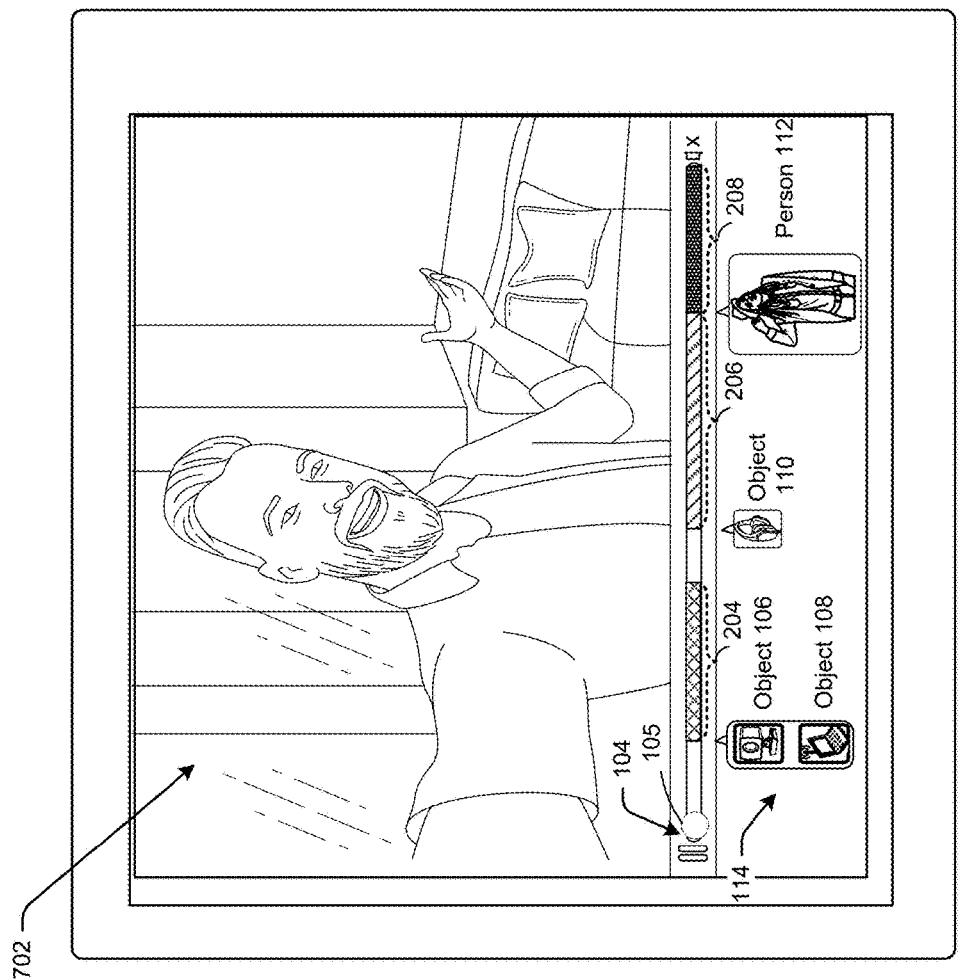
FIG. 7 illustrates an example video presentation with object-based jumplinks in a heat map format, in accordance with one or more embodiments of the present disclosure.

FIG. 7 illustrates an example video presentation 700 with object-based jumplinks in a heat map format, in accordance with one or more embodiments of the present disclosure.

Referring to FIG. 7, a video frame 702 may be one of multiple video frames in a video that may present objects (e.g., object 106, object 108, object 110) and people (e.g., person 112) identified as being present in the video and corresponding to respective unique identifiers (e.g., a unique identifier of an object). The scrubber 104 timeline may use jumplinks to specific frames where an object with a unique identifier has been identified as being present. Because the objects/people may be present in multiple video frames that form video segments, the video segments may be identified. For example, the video segments 204, 206, and 208 of FIG. 2 are shown. In FIG. 7, the video segments may use a heat map format in which the segments are indicated by different colors and/or patterns that may differentiate between whether objects or people are shown in a given segment, the type/category of object, and/or the relevance/interest level of the object to the viewer. For example, a color or pattern may indicate that the object shown in a particular segment may correspond to a user's search history, purchase history, viewing history, virtual shopping cart, or the like. In one example, when the viewer reaches the video by searching for an object that is identified in the video, the heat map color/pattern may signal that specific object in the corresponding segment, and may signal a level or type of user engagement with an object (e.g., how often a user views or otherwise interacts with an object, whether an object is trending, etc.).

In some embodiments, the color or pattern may be based on popularity of objects or people as determined based on the actions and preferences of multiple users (e.g., most frequently viewed, searched, and/or selected objects/people, best reviewed objects/people, most trending objects/people, etc.).

Figure 8:
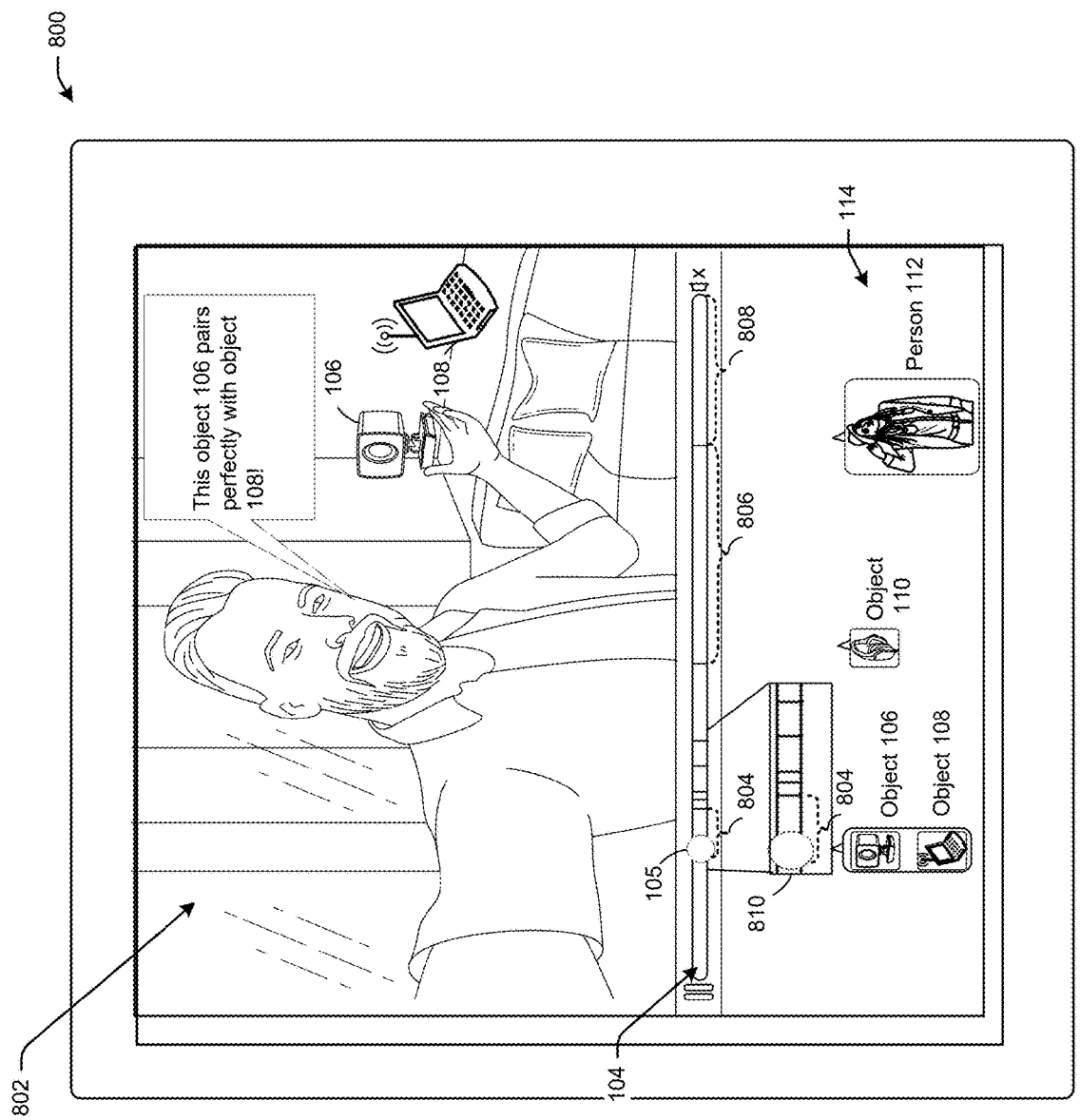
FIG. 8 illustrates an example video presentation with object-based jumplinks with a zoomed-in overlay to show video segments, in accordance with one or more embodiments of the present disclosure.

FIG. 8 illustrates an example video presentation 800 with object-based jumplinks with a zoomed-in overlay to show video segments, in accordance with one or more embodiments of the present disclosure.

Referring to FIG. 8, a video frame 802 may be one of multiple video frames in a video that may present objects (e.g., object 106, object 108, object 110) and people (e.g., person 112) identified as being present in the video and corresponding to respective unique identifiers (e.g., a unique identifier of an object). The scrubber 104 timeline may use jumplinks to specific frames where an object with a unique identifier has been identified as being present. Because the objects/people may be present in multiple video frames that form video segments, the video segments (e.g., video segment 804 presenting the objects 106 and 108, video segment 806 presenting the object 110, and video segment 808 presenting the person 112) may be identified.

Still referring to FIG. 8 because the segments may be close together (e.g., as represented by the vertical lines in the scrubber 104 timeline, including the segments 804-808), an overlay 810 may be used to present a zoomed-in (e.g., enlarged/more precise view) version of the scrubber 104 timeline, including a current segment corresponding to the location of the play head 105, and possibly additional segments proximal to the current segment. In this manner, a user may see the segments more clearly, along with which objects/people the segments may present.

Figure 9A:
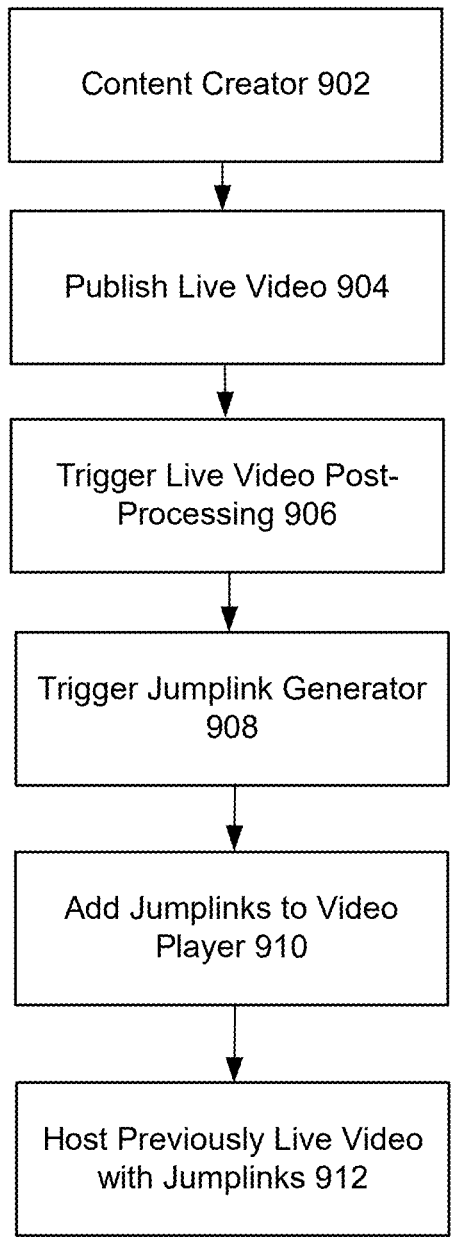
FIG. 9A is a flow for an example process for generating automated jumplinks for previously live video published by a content creator, in accordance with one or more embodiments of the present disclosure.

FIG. 9A is a flow for an example process 900 for generating automated jumplinks for live previously video published by a content creator, in accordance with one or more embodiments of the present disclosure.

Referring to FIG. 9A, a content creator 902 may publish live video 904 (e.g., the video frames of FIGS. 1-3, 7, and 8, the video 410 of FIG. 4), such as to a webpage or other application. Publishing the live video 904 may trigger post-processing 906 of the live video 904 for identifying objects and/or people with unique identifiers that/who are present in the live video 904 in various frames. The post-processing 906 may begin before conclusion of the presentation of the live video 904, resulting in a previously live video. Once the live video 904 has been post-processed to a previously live video, a jumplink generator 908 may be triggered, and may use the multi-modal process (e.g., FIG. 4) to analyze the video content and automatically create jumplinks based on unique identifiers corresponding to the objects/people identified in the video. The auto-generation of the jumplinks may yield metadata for the video frames, including the unique identifiers, and their start times and end times in the video (e.g., corresponding to video frames) as a metadata triplet that may be used to generate the jumplinks within the video player interface (e.g., adding the jumplinks to the video player 910). Subsequently, the previously live video with the jumplinks may be hosted 912 (e.g., via webpage or other application).

Figure 9B:
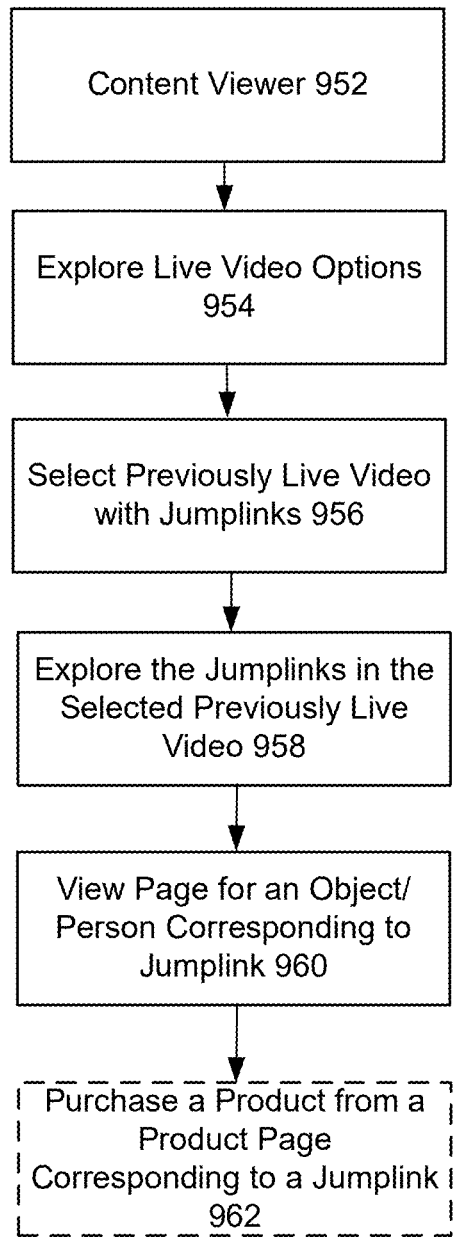
FIG. 9B is a flow for an example process for viewers interacting with video with automated jumplinks, in accordance with one or more embodiments of the present disclosure.

FIG. 9B is a flow for an example process 950 for viewers interacting with video with automated jumplinks, in accordance with one or more embodiments of the present disclosure.

Referring to FIG. 9B, a content viewer 952 may explore live video options 954, such as the previously live video with jumplinks created in FIG. 9A. The live video options 954 may be presented on a webpage or other application. From the live video options 954, the content viewer 952 select a previously live video with jumplinks 956, and selection may result in playback of the previously live video with jumplinks 956 (e.g., via a media player, webpage, etc.). The content viewer 952 may explore 958 the jumplinks in the previously live video by interacting with them (e.g., moving the play head 105 of FIG. 1, selecting objects/people indicated as being present in the video, etc.). The interaction may include clicking or otherwise selecting an object indicated as present in the video and having a corresponding jumplink. As a result of the interaction, the content viewer 952 may be redirected or presented with an option to visit a page that presents more information about the selected object. The content viewer 952 may view 960 the page for the object. When the page is a product page (e.g., the selected object is a product), the content viewer 962 may purchase the product from the page (e.g., by adding the product to a virtual shopping cart, etc.).

Figure 9C:
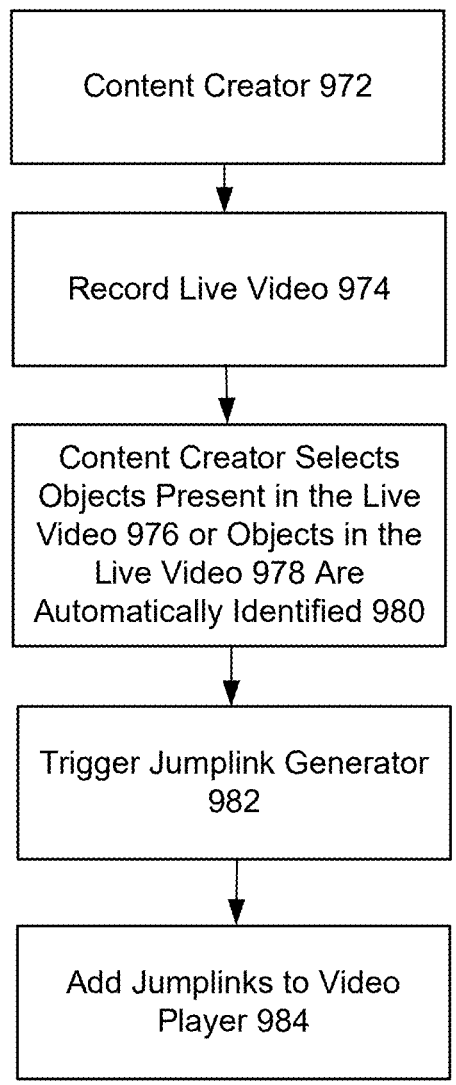
FIG. 9C is a flow for an example process for generating automated jumplinks for live video published by a content creator, in accordance with one or more embodiments of the present disclosure.

FIG. 9C is a flow for an example process 970 for generating automated jumplinks for live video published by a content creator, in accordance with one or more embodiments of the present disclosure.

Referring to FIG. 9C, a content creator 972 may record live video 974. As the content creator 972 records the live video 974, the content creator 972 may select objects present in the live video 978 (e.g., indicating which times in the live video 974 that the objects are present) or the objects in the live video may be identified automatically 980 (e.g., using the image similarity module 418 of FIG. 4). Selection or identification of the objects in the live video 974 may trigger a jumplink generator 982 to generate corresponding jumplinks for the selected/identified objects and their timestamps (e.g., corresponding to video frames), and the jumplinks may be added to the video player 984 that plays the video frames.

Figure 10:
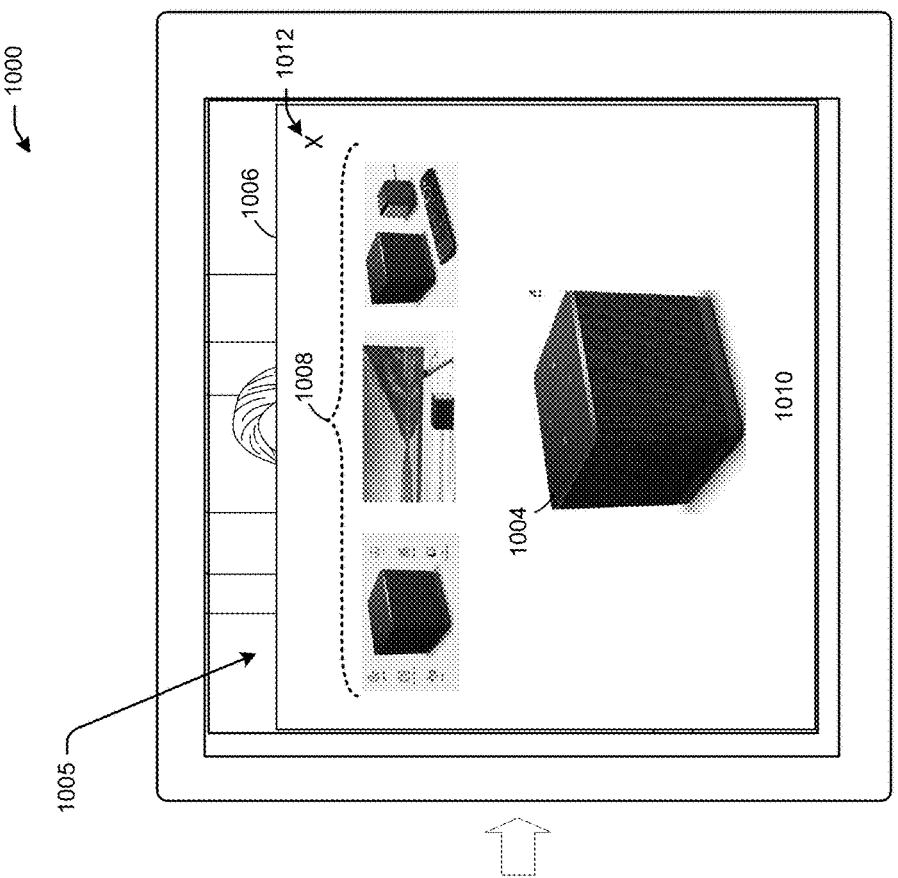
FIG. 10 illustrates an example video presentation with object-based jumplinks with a detail page overlay option, in accordance with one or more embodiments of the present disclosure.
Figure 10:
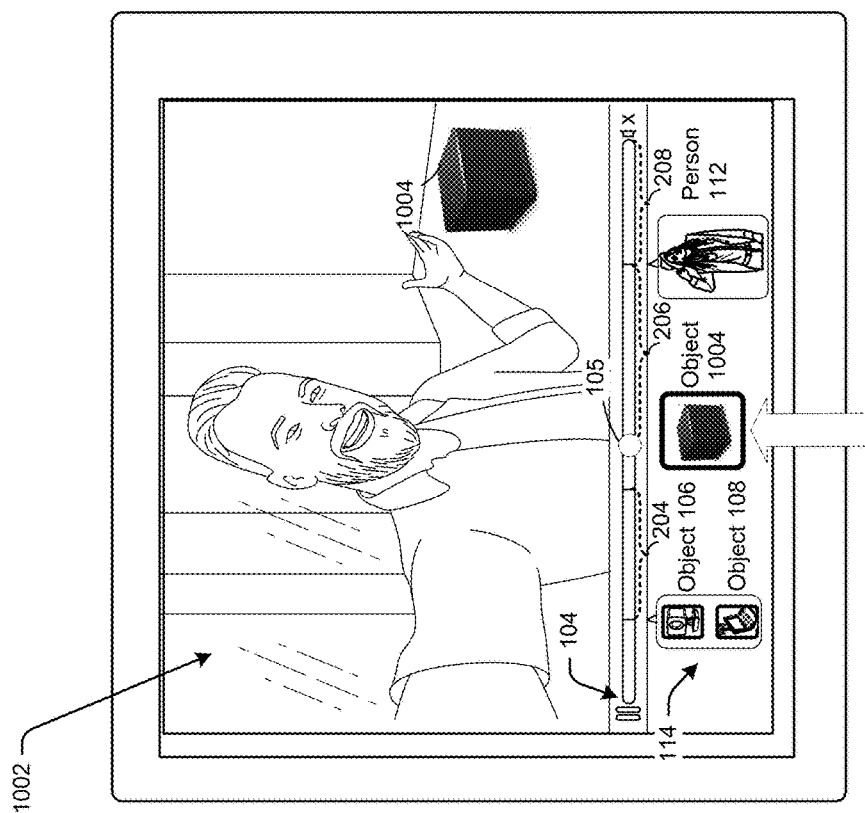

FIG. 10 illustrates an example video presentation 1000 with object-based jumplinks with a detail page overlay option, in accordance with one or more embodiments of the present disclosure.

Referring to FIG. 10, a video frame 1002 of a video that presents objects at different frames (e.g., the object 106, the object 108, and the person 112 of FIG. 1, and object 1004). When the play head 105 is at the video frame 1002 on the scrubber 104 timeline, the object 1004 with a corresponding jumplink to the video frame 1002 may be presented. When a user selects the object 1004 (e.g., either via a jumplink image 114 of the object 1004 or via the object 1004 in the video frame 1002), an overlay interface 1006 may be presented during the video (e.g., a subsequent video frame 1005). In this manner, the video may continue to be presented while at least partially overlaid with the overlay interface 1006. The overlay interface 1006 may show the object 1004, along with additional images 1008 of the object 1004, allowing a user to select from the additional images 1008 to see different vantage points, use cases, and the like, of the object 1004. The overlay interface 1006 also may include additional information 1010 for the object 1004, such as a price (e.g., when the object 1004 is an item for sale), an option to add to a virtual shopping cart, a user rating, any promotions or discounts for the object 1004, any media titles where the object 1004 may be present, and/or similar objects (e.g., based on object categories, user views and/or purchases, etc.). When a user selects an exit 1012 indicator (e.g., the "x") of the overlay interface 1006, the overlay interface 1006 may be removed from presentation while the video continues to play. In this manner, a user may learn more information 1010 and/or see additional images 1008 of the object 1004 without leaving the video stream (e.g., to view a separate page for the object 1004).

Figure 11:
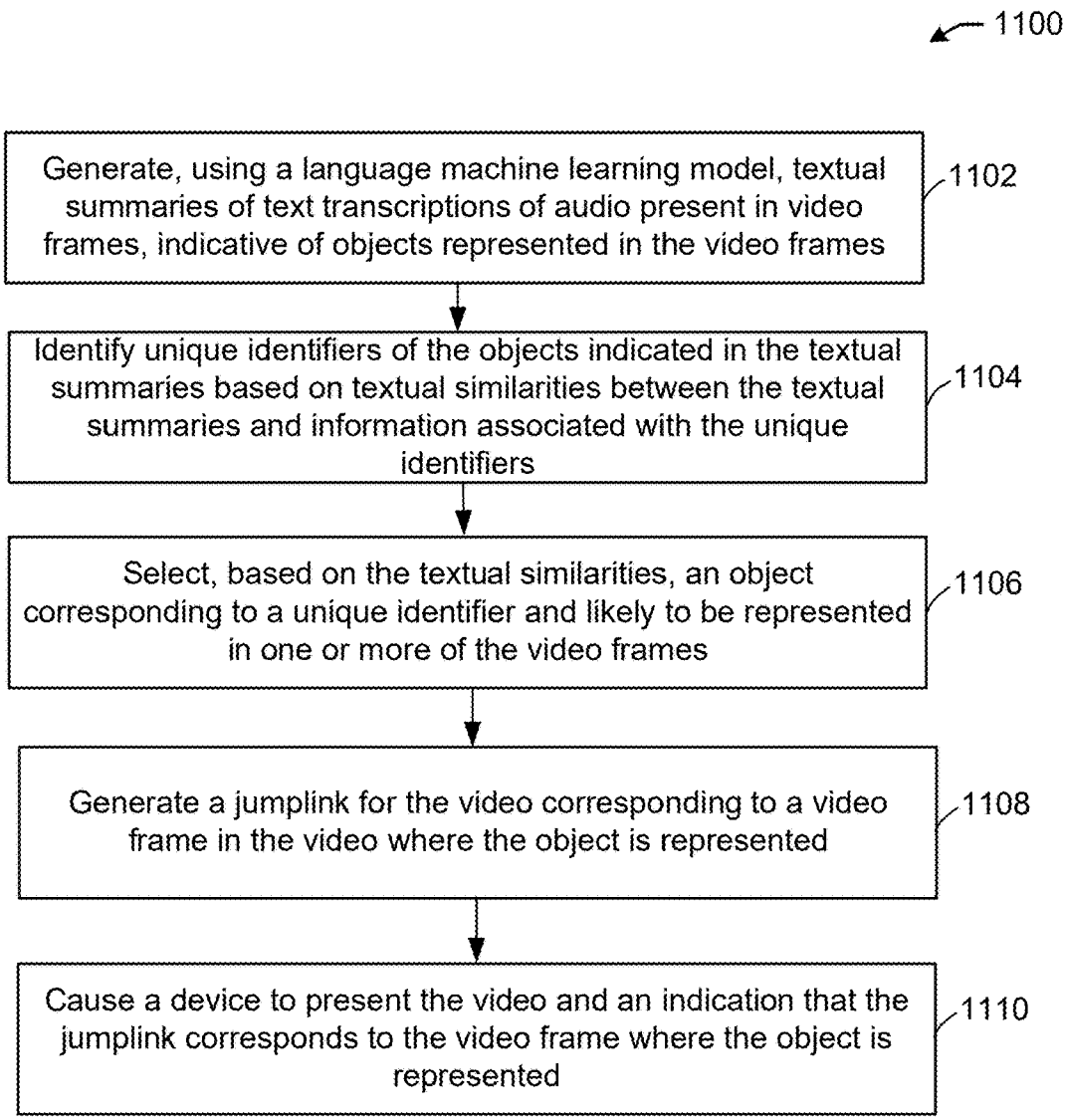
FIG. 11 is a flow for an example process for generating and presenting video with jumplinks for objects, in accordance with one or more embodiments of the present disclosure.

FIG. 11 is a flow for an example process 1100 for generating and presenting video with jumplinks for objects and people, in accordance with one or more embodiments of the present disclosure.

At block 1102, a device (or system, e.g., components of FIG. 4, the jumplink devices 1219 of FIG. 12) may generate, using a language machine learning model (e.g., the language model 422) textual summaries of text transcriptions of audio present in video frames of a video. The textual summaries may be indicative of objects or people represented in the video frames.

At block 1104, the device may identify unique identifiers of the objects or people indicated in the textual summaries based on textual similarities between the textual summaries and information associated with the identifiers. For example, the information may include object names, object descriptions, names of people, and descriptions of the people, and wherein the information is from pages describing objects and people.

At block 1106, the device may select, based on the textual similarities (and optionally based on image similarities), an object corresponding to a unique identifier and likely to be represented in one or more of the video frames.

At block 1108, the device may generate a jumplink for the video corresponding to a video frame in the video where the object is represented. The jumplink may corresponding to multiple frames that present the object (e.g., a video segment). The jumplink may allow a user viewing the video to see which objects or people are presented in which video frames of the video.

At block 1110, the device may cause the video and an indication that the jumplink corresponds to the video frame where the object is represented, to be presented (e.g., using a video player). The video may be presented with a timeline and the indication so that the indication shows where in a timeline (e.g., which video frames) present any objects or people identified and having a corresponding unique identifier. Presentation of the video and the indication may occur in a variety of ways, such as by showing images of the objects or people identified and having jumplinks, using video segment indicators to show and differentiate between segments showing respective objects or people, a heat map format, an enlarged overlay of a portion of the timeline corresponding to a location of a play head of the timeline and showing one or more segments and/or jumplink indicators at the corresponding times of the enlarged portion, and the like.

The examples herein are not meant to be limiting.

Figure 12:
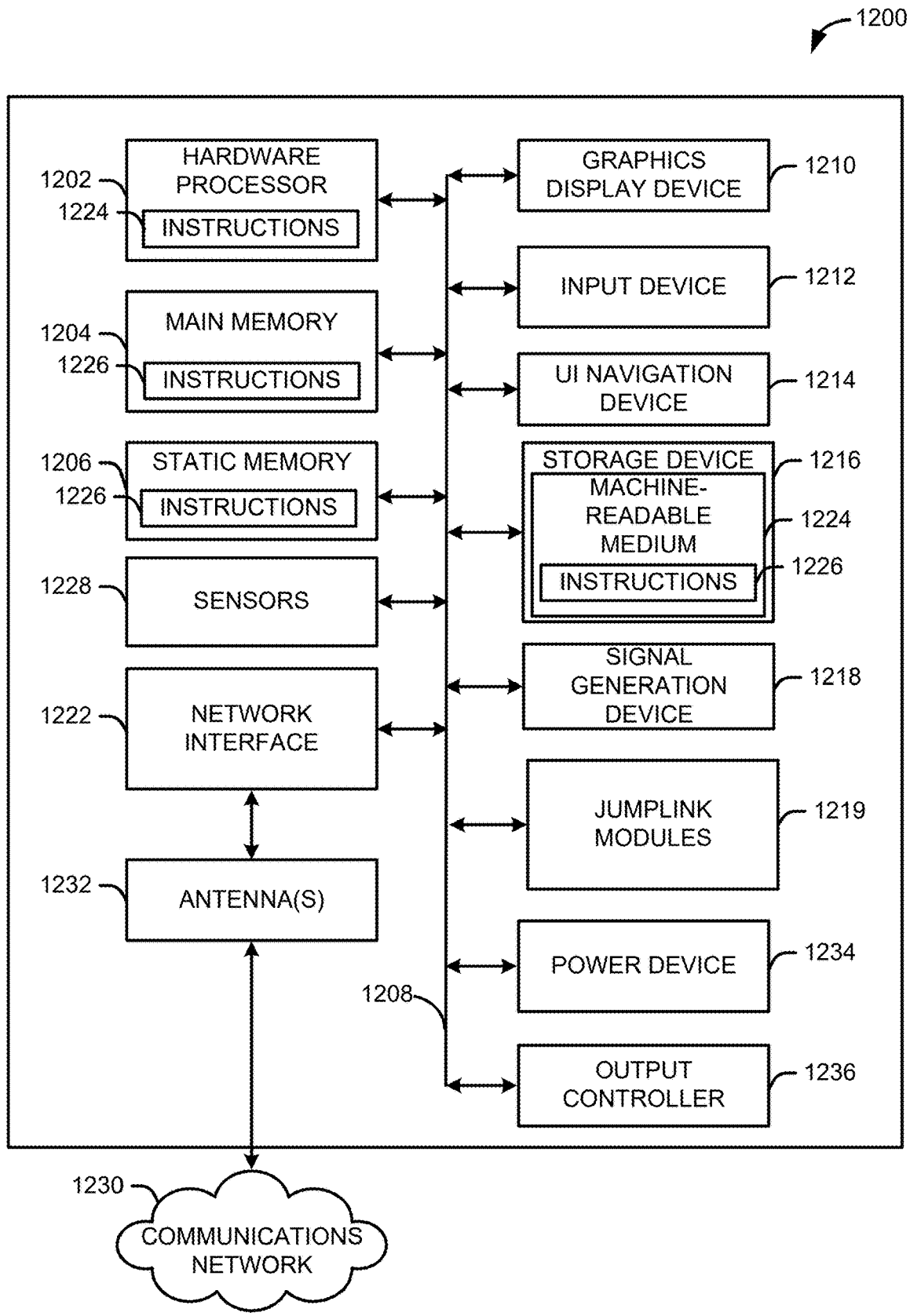
FIG. 12 illustrates a block diagram of an example machine upon which any of one or more techniques (e.g., methods) may be performed, in accordance with one or more example embodiments of the present disclosure.

FIG. 12 illustrates a block diagram of an example machine upon which any of one or more techniques (e.g., methods) may be performed, in accordance with one or more example embodiments of the present disclosure.

In other embodiments, the machine 1200 may operate as a standalone device or may be connected (e.g., networked) to other machines. In a networked deployment, the machine 1200 may operate in the capacity of a server machine, a client machine, or both in server-client network environments. The machine 1200 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 1200 (e.g., computer system) may include a hardware processor 1202 (e.g., a central processing unit (CPU), a graphics processing unit (GPU), a hardware processor core, or any combination thereof), a tensor processing unit (TPU), a main memory 1204 and a static memory 1206, some or all of which may communicate with each other via an interlink (e.g., bus 1208). The machine 1200 may further include a power device 1234, a graphics display device 1210, an input device 1212 (e.g., a keyboard), and a user interface UI navigation device 1214 (e.g., a mouse). In an example, the graphics display device 1210, input device 1212, and UI navigation device 1214 may be a touch screen display. The machine 1200 may additionally include a storage device 1216, a signal generation device 1218, one or more jumplink modules 1219 (e.g., representing any of the components FIG. 4 and capable of performing the process 1100 of FIG. 11), a network interface 1222 coupled to antenna(s) 1232, and one or more sensors 1228. The machine 1200 may include an output controller 1236, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1216 may include a machine-readable medium 1224 on which is stored one or more sets of data structures or instructions 1226 (e.g., software) embodying or utilized by any one or more of the techniques or functions described herein. The instructions 1226 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

While the machine-readable medium 1224 is illustrated as a single medium, the term "machine-readable medium" may include a single medium or multiple media (e.g., a centralized or distributed database, and/or associated caches and servers) configured to store the one or more instructions 1226.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1226 may further be transmitted or received over a communications network 1230 using a transmission medium via the network interface 1222 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 1222 may include one or more physical jacks (e.g., Ethernet, coaxial, or phone jacks) or one or more antennas to connect to the communications network 1230. The term "transmission medium" shall be taken to include any intangible medium that is capable of storing, encoding, or carrying instructions for execution by the machine 1200 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for generating and presenting jumplinks for objects in video, the method comprising:
   extracting, by at least one processor, video frames for a video;
   converting, by the at least one processor, speech corresponding to the video frames to text;
   prompting, by the at least one processor, a large language model to generate textual summaries of the text and validate the generated summaries, wherein the textual summaries are indicative of objects represented in the video frames;
   generating, by the large language model, the textual summaries;
   identifying, by the at least one processor, unique identifiers of the objects indicated in the textual summaries based on textual similarities between the textual summaries and information associated with the unique identifiers;
   selecting, by the at least one processor, based on the textual similarities, an object corresponding to a unique identifier and likely to be represented in one or more of the video frames;
   generating, by the at least one processor, using a consensus algorithm, a jumplink for the video, wherein the jumplink corresponds to a video frame in the video where the object is represented; and
   causing presentation, by the at least one processor, of the video and an indication that the jumplink corresponds to the video frame where the object is represented.

2. The method of claim 1, further comprising:
   identifying, using a pre-trained contrastive language-image pre-training model, the objects represented in the video frames; and
   determining image similarity scores between the objects represented in the video frames and images corresponding to the unique identifiers,
   wherein selecting the object corresponding to the unique identifier is further based on an average of the image similarity score and the textual similarities, and
   wherein the textual similarities are weighted higher than the image similarity scores in the average.

3. The method of claim 1, further comprising:
   receiving user inputs selecting the objects as presented by the video frames; and
   validating, based on the textual similarity scores, that the objects selected by the user inputs are likely to be represented in the one or more of the video frames.

4. The method of claim 1, wherein the indication that the jumplink corresponds to the video frame comprises an image of the object, the method further comprising:
   receiving a user selection of the image or of the object when presented in the video frame; and
   causing presentation of a page comprising additional information about the object based on the user selection.

5. A method for generating and presenting jumplinks for objects in video, the method comprising:
   identifying, by at least one processor, unique identifiers of objects indicated in text associated with video frames based on textual similarities between the text and information associated with the unique identifiers;

selecting, by at least one processor, based on the textual similarities, an object corresponding to a unique identifier and likely to be represented in one or more of the video frames;

generating, by at least one processor, a jumplink for the video, wherein the jumplink corresponds to a video frame in the video where the object is represented; and causing, by at least one processor, a device to present the video and an indication that the jumplink corresponds to the video frame where the object is represented.

6. The method of claim 5, further comprising:
identifying, using a pre-trained image model, the objects represented in the video frames; and
determining image similarity scores between the objects represented in the video frames and images corresponding to the unique identifiers,
wherein selecting the object corresponding to the unique identifier is further based on an average of the image similarity score and the textual similarities.

7. The method of claim 6, wherein the textual similarities are weighted higher than the image similarity scores in the average.

8. The method of claim 5, further comprising:
receiving user inputs selecting the objects as presented by the video frames; and
validating, based on the textual similarity scores, that the objects selected by the user inputs are likely to be represented in the one or more of the video frames.

9. The method of claim 5, wherein the indication that the jumplink corresponds to the video frame comprises an image of the object, the method further comprising:
receiving a user selection of the image or of the object when presented in the video frame; and
causing presentation of a page comprising additional information about the based on the user selection.

10. The method of claim 9, wherein the text comprises textual summaries of text transcriptions of audio present in video frames, the method further comprising:
generating, by a language machine learning model, the textual summaries, wherein the textual summaries are indicative of objects represented in the video frames, and
wherein the textual similarities also are between object metadata and the information associated with the unique identifiers.

11. The method of claim 5, wherein the information associated with the unique identifiers comprises object names, object descriptions, frequently asked questions, and object properties, and wherein the information is from pages describing objects.

12. The method of claim 5, further comprising:
determining a start time for the object being present in the video; and
determining an end time for the object being present in the video,
wherein the video frame corresponds to the start time, the end time, or a time between the start time and the end time.

13. The method of claim 12, further comprising:
causing presentation of a timeline with a play head; and
receiving a user movement of the play head to the start time,
wherein the indication that the jumplink corresponds to the video frame is presented based on the user movement of the play head to the start time.

14. The method of claim 12, further comprising:
causing presentation of a timeline with a play head,
wherein the timeline is presented with video segments corresponding to where identified objects are presented in the video frames, and
wherein the video segments comprise a first video segment in which the object is present, the first video segment corresponding to the start time and the end time.

15. The method of claim 14, wherein the video segments are presented using a heat map format differentiating between respective objects presented in the video segments and differentiating between user engagement of the respective objects.

16. The method of claim 14, further comprising:
causing presentation of an overlay of the timeline based on a location of the play head, wherein the overlay is an enlarged version of the timeline showing at least one of the video segments corresponding to the location of the play head.

17. The method of claim 5, wherein selecting the object is further based on at least one of a virtual shopping cart of a user to whom the video is presented or a popularity of the object, wherein the popularity is based on at least one of views, selections, searches, purchases, or user reviews.

18. A device for generating and presenting jumplinks for objects in media, the device comprising memory coupled to at least one processor, wherein the at least one processor is configured to:
generate a jumplink for media,
wherein the jumplink corresponds to a media frame in the media where an object is represented, and
wherein the object is selected for the jumplink based on textual similarities between text associated with the media and information associated with unique identifiers of objects indicated in the text;
cause presentation of the media, a timeline for the media, and an indication that the jumplink corresponds to the media frame where the object is represented,
wherein the indication that the jumplink corresponds to the media frame where the object is represented comprises an image of the object,
wherein at least one of the image of the object or the object presented in the media frame comprises a link to a page for the object, and
wherein a user selection of the link causes presentation of the page for the object.

19. The device of claim 18, wherein the at least one processor is further configured to:
cause presentation of an overlay interface at least partially overlapping the media,
wherein the overlay interface presents selectable images of the object, and additional information for the object,
wherein the additional information comprises at least one of a price, an option to add the object to a virtual shopping cart, a discount or promotion, or a user rating, and
wherein when a user exits the overlay interface, presentation of the overlay interface disappears while the media continues presentation.

20. The device of claim 18, wherein the timeline is presented with media segments corresponding to where identified objects are presented in the media frames, and
wherein the media segments comprise a first media segment in which the object is present.

* * * * *